United States Patent Office 2,768,899
Patented Oct. 30, 1956

2,768,899
SODIUM CHLORIDE COMPOSITION

Frank Waldo, Pittsburgh, Pa., assignor to Columbia-Southern Chemical Corporation, Allegheny County, Pa., a corporation of Delaware No Drawing. Application April 23, 1956,
Serial No. 579,707

2 Claims. (Cl. 99—143)

This invention relates to a novel edible salt composition. It is commonly recognized that crystalline sodium chloride tends to absorb water, on standing in atmospheric air of normal humidity, to such an extent that the crystals tend to coalesce and the product becomes lumpy.

According to the present invention, it has been found that a stable weather-proof composition may be provided by mixing crystalline sodium chloride of the conventional edible grade with a small amount, usually in the range of ½ to 5 percent by weight, of finely divided, precipitated, calcium silicate having the composition $CaO(SiO_2)_x$, where $x$ is a number between 2 and 4. Edible salt compositions comprising sodium chloride and the above described calcium silicate are stable and do not agglomerate or become lumpy even when allowed to stand in a humid atmosphere for long periods of time. The calcium silicate which is used according to this invention may be prepared by reaction of calcium chloride with sodium silicate having the composition $Na_2O(SiO_2)_x$, where $x$ is a number, including fractional numbers, between 2 and 4.

In the preparation of the calcium silicate to be used according to this invention, the sodium silicate and calcium silicate normally are mixed together with vigorous agitation. This may be done, for example, by establishing a pool of calcium chloride solution containing 50 to 150 (usually about 100) grams per liter of calcium chloride, and adding a solution of sodium silicate containing 50 to 100 (usually about 100) grams of $SiO_2$ per liter to this solution with vigorous agitation. Alternatively, other methods of effecting the mixing may be used.

Following the precipitation, the calcium silicate is recovered by settling and/or filtration, and is dried, usually at a temperature between 100 and 200° C., although higher temperatures may be used.

The resulting calcium silicate is a finely divided product having an average ultimate particle size below 0.1 micron, and having a surface area ranging between 10 to 150 square meters per gram. This calcium silicate normally contains about 4 to 10 percent by weight of bound water which is water which will remain in the pigment after drying the pigment for 24 hours at 105° C. This bound water appears to be chemically combined with the calcium silicate. Such a pigment is termed "hydrated." However, essentially all of the bound water may be driven off the pigment by calcining at elevated temperatures, for example, 400 to 800° C. Usually, the calcium silicate also contains some quantity (about 4 to 10 percent by weight) of moisture which can be driven off readily by heating at 105° C. for 24 hours.

The calcium silicate is incorporated in the salt composition simply by mixing commercial crystalline sodium chloride, which may or may not contain impurities, with the finely divided calcium silicate. In general, approximately 2 percent by weight of the calcium silicate, based upon the weight of sodium chloride, is sufficient for the purpose. However, other concentrations, usually about 0.5 to 5 percent by weight of calcium silicate, based on the sodium chloride weight, may be used if desired.

The following is a typically illustrative composition:

98.5 pounds sodium chloride
1.5 pounds hydrated calcium silicate

Other components, such as potassium or sodium iodide, sodium thiosulphate and the like, may be present in the above described composition if desired.

Although the present invention has been described with reference to the specific details of certain embodiments, it is not intended that such details shall be regarded as limitations upon the scope of the invention except insofar as included in the accompanying claims.

This application is a continuation-in-part of copending application, Serial Number 286,029, filed May 3, 1952, now abandoned.

I claim:
1. An edible sodium chloride composition stabilized against agglomeration due to absorption of moisture, comprising an edible grade of sodium chloride and from ½ to 5 percent by weight, based upon the weight of sodium chloride, of finely divided, precipitated calcium silicate having the composition $CaO(SiO_2)_x$, where $x$ is a number between 2 and 4, an average ultimate particle size below 0.1 micron, a surface area ranging between 10 and 150 square meters per gram and a bound water content of about 4 to 10 percent by weight.

2. The composition of claim 1 wherein said calcium silicate is about 2 percent by weight, based upon the weight of said sodium chloride.

References Cited in the file of this patent

UNITED STATES PATENTS

| | | |
|---|---|---|
| 1,978,040 | Daitz | Oct. 23, 1934 |
| 2,407,151 | Glogau | Sept. 3, 1946 |
| 2,664,357 | Miller | Dec. 29, 1953 |